(12) United States Patent
Ireland (10) Patent No.: US 6,626,375 B1
(45) Date of Patent: Sep. 30, 2003

(54) METHOD AND APPARATUS FOR AERIAL SPRAY MARKING OF GROUND SURFACES

(75) Inventor: Sean P. Ireland, Hampden, ME (US)

(73) Assignee: Cybercore, Inc., Hampden, ME (US)

( * ) Notice: Subject to any disclaimer, the term of this patent is extended or adjusted under 35 U.S.C. 154(b) by 0 days.

(21) Appl. No.: 09/692,760

(22) Filed: Oct. 19, 2000

(51) Int. Cl.⁷ .............................................. B64D 1/18
(52) U.S. Cl. ........................ 239/171; 239/373; 169/53
(58) Field of Search ................. 239/171, 346, 239/349, 350, 364, 365, 373; 169/53; 251/30.01

(56) References Cited

U.S. PATENT DOCUMENTS

| | | | | |
|---|---|---|---|---|
| 1,619,183 A | * | 3/1927 | Bradner et al. .............. | 239/171 |
| 3,220,482 A | * | 11/1965 | Eveleth ......................... | 141/21 |
| 3,494,423 A | * | 2/1970 | Stansbury et al. ............ | 169/43 |
| 4,291,769 A | * | 9/1981 | Muller .......................... | 169/13 |
| 4,971,082 A | * | 11/1990 | Kovaletz ...................... | 134/34 |
| 5,150,741 A | * | 9/1992 | Valy et al. ..................... | 141/18 |
| 5,363,989 A | * | 11/1994 | Zeamer et al. ............... | 137/382 |
| 6,003,782 A | | 12/1999 | Kim et al. | |

* cited by examiner

*Primary Examiner*—Christopher Kim
(74) *Attorney, Agent, or Firm*—Pierce Atwood (57) ABSTRACT

Aerial spraying is accomplished with a system including a storage tank for holding a substance to be sprayed, a compressed gas cylinder for pressurizing the storage tank, a spray nozzle assembly, and a feed line for delivering pressurized substance from the storage tank to the spray nozzle assembly. The spray nozzle assembly includes a spray nozzle that will discharge a pressurized shot of the substance onto the ground when the spray nozzle assembly is activated. A controller is provided for automatically activating the spray nozzle assembly in accordance with user selected settings. The storage tank, cylinder and spray nozzle assembly are all mounted on a frame, which can be supported from an aircraft. In operation, the system is suspended or otherwise mounted below an aircraft and flown over the target site. At which point, the spray nozzle assembly is selectively activated to spray a pressurized and directed solid stream of substance onto the ground surfaces with precision. The system and method are particularly useful for aerial spray marking applications. In which case, the substance would be a marking substance such as paints, dyes or the like.

16 Claims, 5 Drawing Sheets

METHOD AND APPARATUS FOR AERIAL SPRAY MARKING OF GROUND SURFACES

BACKGROUND OF THE INVENTION

This invention relates generally to aerial spray marking of earth surfaces and more particularly to an aerial spray marking system that produces highly forceful shot of marking substance capable of penetrating dense foliage.

There are many situations in which a need arises to mark off or delineate large land areas. For instance, it is common in the forestry industry to first mark large blocks of forested land prior to sending crews in for harvesting, commercial thinning or pre-commercial thinning, thereby clearly indicating to the crews the boundaries of the block or blocks to be cut. Other industries where the need to mark off large land areas arises include agriculture, civil engineering and telecommunications. Land marking is also applicable for many military purposes.

Normal methods for marking forestry boundaries for commercial and pre-commercial thinning blocks and mature growth harvest areas are walking the boundaries of the areas on foot and placing a flag or other marker every few feet. This process is labor intensive and time consuming in that it takes a large crew of workers a long time to mark off even a modestly sized block. The time requirements are exacerbated by the fact that such areas are typically difficult to traverse because of dense growth. Even on non-forested areas, the large areas generally required to be marked limit the efficiency of manual marking.

Because of the large time requirement, marking is ordinarily started well in advanced of the planned cut. This means that the markers are often missing or disturbed by the time the cutting crew arrives at the site. Thus, conventional marking processes are not always sustainable long enough to achieve the desired objective of indicating the boundaries to be cut.

Accordingly, there is a need for a method and apparatus that is able to easily and quickly mark ground surfaces, regardless of the nature of the terrain. Such marking should also be sustainable over long periods of time.

BRIEF SUMMARY OF THE INVENTION

The above-mentioned need is met by the present invention, which provides a system and method for aerial spraying, particularly spray marking, of ground surfaces. The system includes a storage tank for holding a substance, means for pressurizing the storage tank, a spray nozzle assembly, and a feed line for delivering pressurized substance from the storage tank to the spray nozzle assembly. In one preferred embodiment, the means for pressurizing the storage tank includes a cylinder of compressed gas that is connected to the storage tank by a gas carrying system comprising a pressure regulator, a high pressure line connecting the cylinder to the pressure regulator, and a first regulated gas line connecting the pressure regulator to the storage tank. The spray nozzle assembly includes a first valve connected to the feed line, a spray nozzle connected to the first valve, and a second valve arranged to open and close the first valve. A second regulated gas line connects the pressure regulator to the spray nozzle assembly such the pressurized gas will open or close the first valve depending on the state of the second valve. The substance will be discharged from the spray nozzle whenever the first valve is open.

A controller is provided for automatically controlling the opening and closing of the first valve in accordance with user selected settings. The system can include a pressure transducer for sensing the pressure of gas output from the pressure regulator. The controller can thus close a shut off valve disposed in the feed line in response to the sensed pressure falling below a predetermined level. The storage tank, cylinder and spray nozzle assembly are all mounted on a frame, which can be supported from an aircraft. Thus, in operation, the system is suspended or otherwise mounted below an aircraft and flown over the target site. At which point, the spray nozzle assembly is selectively activated so as to spray pressurized substance onto the ground surfaces. For aerial spray marking applications, the substance would be a marking substance such as paints, dyes and the like.

The present invention and its advantages over the prior art will become apparent upon reading the following detailed description and the appended claims with reference to the accompanying drawings.

DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
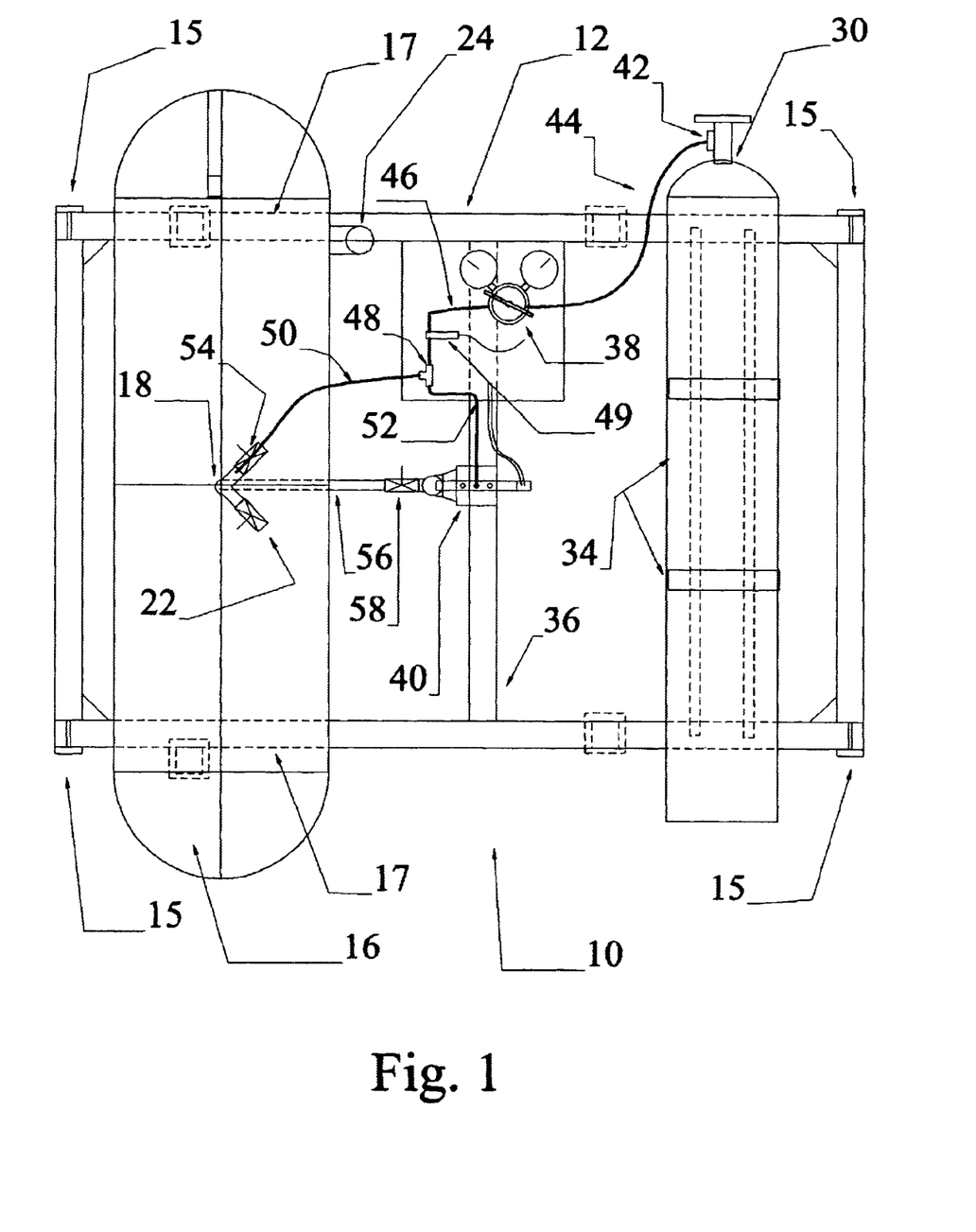
FIG. 1 is a top view of an aerial spray marking apparatus.
Figure 2:
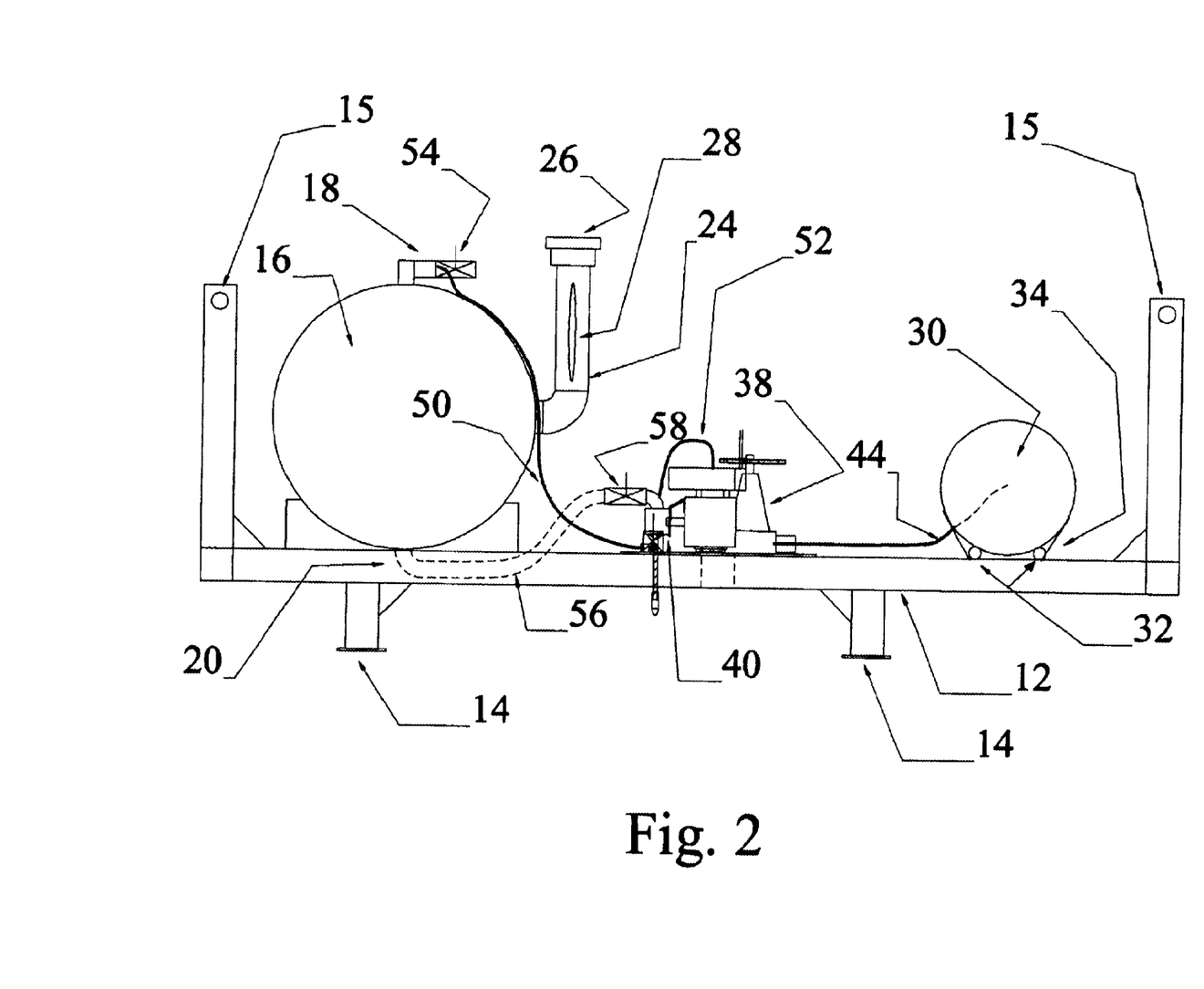
FIG. 2 is a side view of the aerial spray marking apparatus.

Referring to the drawings wherein identical reference numerals denote the same elements throughout the various views, FIGS. 1 and 2 show an aerial spray marking apparatus 10 that can be mounted below a helicopter or other aircraft for marking ground surfaces from the air. As used herein, the term "ground surfaces" refers to all surfaces on the planet, including forested areas, non-forested areas and even water surfaces. The apparatus 10 includes a substantially rectangular frame 12 having four legs 14 extending downwardly from the corners thereof for supporting the apparatus 10 on the ground when not in use. Each corner of the frame 12 also has an attachment arm 15 extending upwardly therefrom. The attachment arms 15 are used for mounting the apparatus 10 below an aircraft. The frame 12 is lightweight and capable of withstanding the total moment generated during flight while the apparatus 10 is fully loaded. Various gussets are provided for strengthening the frame 12.

A refillable storage tank 16 is fixedly mounted to the top side of the frame 12 with two straps 17 or any other means for mounting the tank 16 to the frame 12. The storage tank 16 is positioned crosswise on the frame 12, near a first end thereof. The storage tank 16 holds a marking substance that is sprayed onto the ground surface in a manner that will be described below. An inlet port 18 is provided at the top of the storage tank 16, and a discharge port 20 is provided at the bottom of the storage tank 16. The inlet port 18 includes a vent 22 for depressurizing the tank 16. The vent 22 is a manually operated ball valve that is normally kept closed, but is opened when the tank 16 needs to be depressurized. The capacity of the storage tank 16 is only limited by the gross lifting weight of the aircraft carrying the apparatus 10. Typically, the storage tank 16 will have a 60 gallon capacity and should also be rated for an operating pressure on the order of 150 pounds per square inch (psi).

The storage tank 16 further includes a fill tube 24 that provides a means for refilling the tank 16 with the marking substance. The fill tube 24 connects to the side of the storage tank 16 at approximately mid-height and extends upward to a point level with or slightly above the top of the tank 16.

Thus, the storage tank 16 is refilled by pouring marking substance into the top of the fill tube 24. A replaceable cap 26 is provided on the top of the fill tube 24 to prevent spillage. Although the fill tube 24 could alternatively be disposed on the top of the storage tank 16, the side mounting permits the fill tube 24 to also function as a level indicator. That is, the level of marking substance in the fill tube 24 will be equal to the level in the storage tank 16.

When the fill tube 24 is empty, then it is known that the marking substance level in the storage tank 16 is below the point where the fill tube 24 connects to the storage tank 16. The fill tube 24 can be provided with an elongated sight glass 28, or be made of a transparent or translucent material, to facilitate the level indicator function.

The aerial spray marking apparatus 10 includes a compressed gas cylinder 30 removably mounted to the top side of the frame 12. Like the storage tank 16, the compressed gas cylinder 30 is positioned crosswise on the frame 12, but it is located near the end of the frame 12 opposite from the storage tank 16. Preferably, the compressed gas cylinder 30 is mounted in such a manner that it can be quickly and easily removed when empty so as to be replaced with another cylinder the gas cylinder 30 sits on a pair of rods 32 fixedly secured across the frame 12 and is held in place by means such as straps 34 that encircle the gas cylinder 30 and the rods 32.

The frame 12 further includes a support beam 36 that extends across the frame 12 about midway between the storage tank 16 and the compressed gas cylinder 30. Mounted on the support beam 36 are an adjustable pressure regulator 38 and a spray nozzle assembly 40. The compressed gas cylinder 30, which is a commercially available gas cylinder, has a standard outlet valve 42 and contains a gas (preferably an inert gas such as nitrogen) at a high pressure, typically on the order of 2000 psi. Because the apparatus 10 can pick up static electricity during flight operations, inert gas is used to eliminate the possibility of an explosion that could occur with oxygen. The outlet valve 42 is connected to the pressure regulator 38 by a high pressure line 44, one end of which is attached to the outlet valve 42 by a quick disconnect coupling. The pressure regulator 38 is a commercially available device that steps down the pressure of the gas from the gas cylinder 30 to the desired operating pressure for the apparatus 10. This operating pressure will ordinarily be in the range of about 50–125 psi and can be adjusted depending on the needs of the particular marking task.

The gas output from the regulator 38 is sent via a gas line 46 to a T-fitting 48, which splits the flow of regulated gas. A pressure transducer 49 is disposed in the gas line 46, just upstream of the T-fitting 48, for sensing the pressure of the gas output from the regulator 38. One branch of the T-fitting 48 is connected to the inlet port 18 of the storage tank 16 by a first regulated gas line 50. Pressurized gas flows into the storage tank 16 from the first regulated gas line 50 and pressurizes the tank interior. The other branch of the T-fitting 48 is connected to the nozzle assembly 40 by a second regulated gas line 52. A first shut off valve 54, which can be a manually-operated ball valve, is disposed in the first regulated gas line 50 for shutting off flow of pressurized gas to the storage tank 16.

The discharge port 20 of the storage tank 16 is connected to the nozzle assembly 40 by a feed line 56. As will be described in more detail below, the feed line 56 delivers pressurized marking substance to the nozzle assembly 40 so that it can be sprayed onto the ground surface to be marked. A second shut off valve 58 is disposed in the feed line 56 for shutting off flow of pressurized marking substance to the nozzle assembly 40. In one preferred embodiment, the second shut off valve 58 is an electronically controlled valve, such as a conventional solenoid valve. The valve 58 can then be operated in response to the pressure transducer 49. That is, if the gas pressure sensed by the pressure transducer 49 falls below the minimum acceptable operating pressure, then the valve 58 is automatically closed so as to prevent further operation of the apparatus 10. As an alternative to an electronically controlled valve, the second shut off valve 58 can be a manually-operated ball valve. Thus, even though in-flight shut down could not be achieved, the valve 58 could be closed to shut off flow of pressurized marking substance to the nozzle assembly 40 during maintenance thereof.

Figure 3:
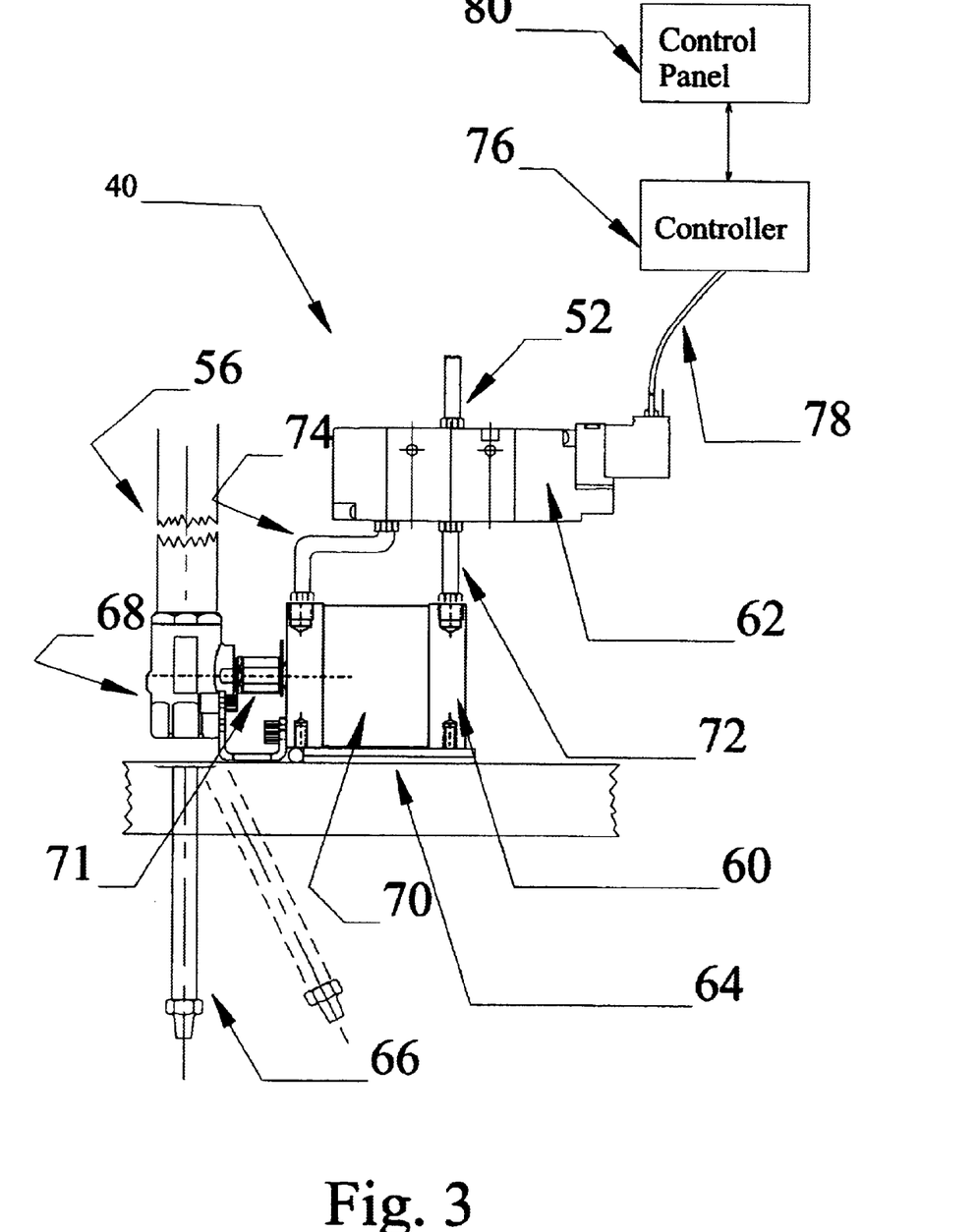
FIG. 3 is a detailed side view of the nozzle assembly from the aerial spray marking apparatus of FIGS. 1 and 2.

Referring now to FIG. 3, the spray nozzle assembly 40 is described in more detail. The nozzle assembly 40 comprises a pneumatically controlled main valve 60 and a solenoid valve 62 for opening and closing the main valve 60. Both valves are commercially available units. The main valve 60 is mounted to the support beam 36 by means of a lockable hinge 64, and the solenoid valve 62 is mounted on top of the main valve 60. A solid stream spray nozzle 66 is attached to the bottom of the main valve 60. The spray nozzle 66 is oriented generally downward to spray marking substance down to the ground when the apparatus 10 is suspended from an aircraft in flight. While only a single spray nozzle is shown, it should be noted that the present invention could be implemented with a bank of such nozzles. The feed line 56 is connected to the inlet of the main valve 60 so that the main valve 60 will control the flow of pressurized marking substance to the spray nozzle 66. Pressurized marking substance will be sprayed from the nozzle 66 when the main valve 60 is open, but closing the main valve 60 will cut off the flow of pressurized marking substance to the spray nozzle 66. Thus, the spray nozzle 66 will spray a solid stream shot of the marking substance whenever the main valve 60 is opened. The forcefulness of the shot depends on the operating pressure set by the pressure regulator 38, wherein a higher operating pressure will produce a more forceful shot.

The hinge 64 is arranged to pivot about a horizontal axis for tilting the spray nozzle 66. That is, the spray nozzle 66 can be positioned so as to be directed straight down (as shown in solid line in FIG. 3) or angled backward with respect to the direction of flight, approximately 45 degrees (as shown in dashed line in FIG. 3) or any position in between. Angling the spray nozzle 66 backward will reduce the affect of wind shear on the stream of marking substance discharged therefrom.

Opening and closing of the main valve 60 is controlled by the solenoid valve 62 which receives pressurized gas from the regulator 38 via the second regulated gas line 52. The main valve 60 comprises a ball valve housing 68, an actuator housing 70 and an axle 71 extending therebetween. First and second pneumatic control ports 72 and 74 fluidly connect the solenoid valve 62 to the actuator housing 70. Depending on the state of the solenoid valve 62, either the first port 72 or the second port 74 will be in fluid communication with the second regulated gas line 52. When the first port 72 is pressurized, a bell crank in the actuator housing 70 will cause the axle 71 to rotate in one direction. The axle rotation will turn the ball in the ball valve housing 68, thereby closing the main valve 60. But when the second port 74 is pressurized, the axle 71 will be rotated in the other direction, thereby opening the main valve 60. Thus, switching the solenoid valve 62 will open or close the main valve 60.

The solenoid valve 62 operates in response to control signals sent from a controller 76 via an electrical cable 78. Preferably, the solenoid valve 62 is configured so that the main valve 60 is open when the solenoid valve 62 receives an electrical signal from the controller 76 and closed when no signal is received. Thus, the main valve 60 will be closed and the apparatus 10 will not spray marking substance if the controller 76 loses power or otherwise fails. The controller 76 also receives an input signal from the pressure transducer 49 and controls the second shut off valve 58 accordingly. Like the main valve 60, the shut off valve 58 will close in the event of a controller failure. The controller 76 can be any suitable control unit such as a programmed logic controller (PLC). One suitable PLC is the Micrologix controller sold by Allen Bradley. The controller 76 is operated via a control panel 80 located in the aircraft cockpit. Thus, a user can remotely control the spray marking operation from the cockpit while the aircraft is in flight.

Figure 4:
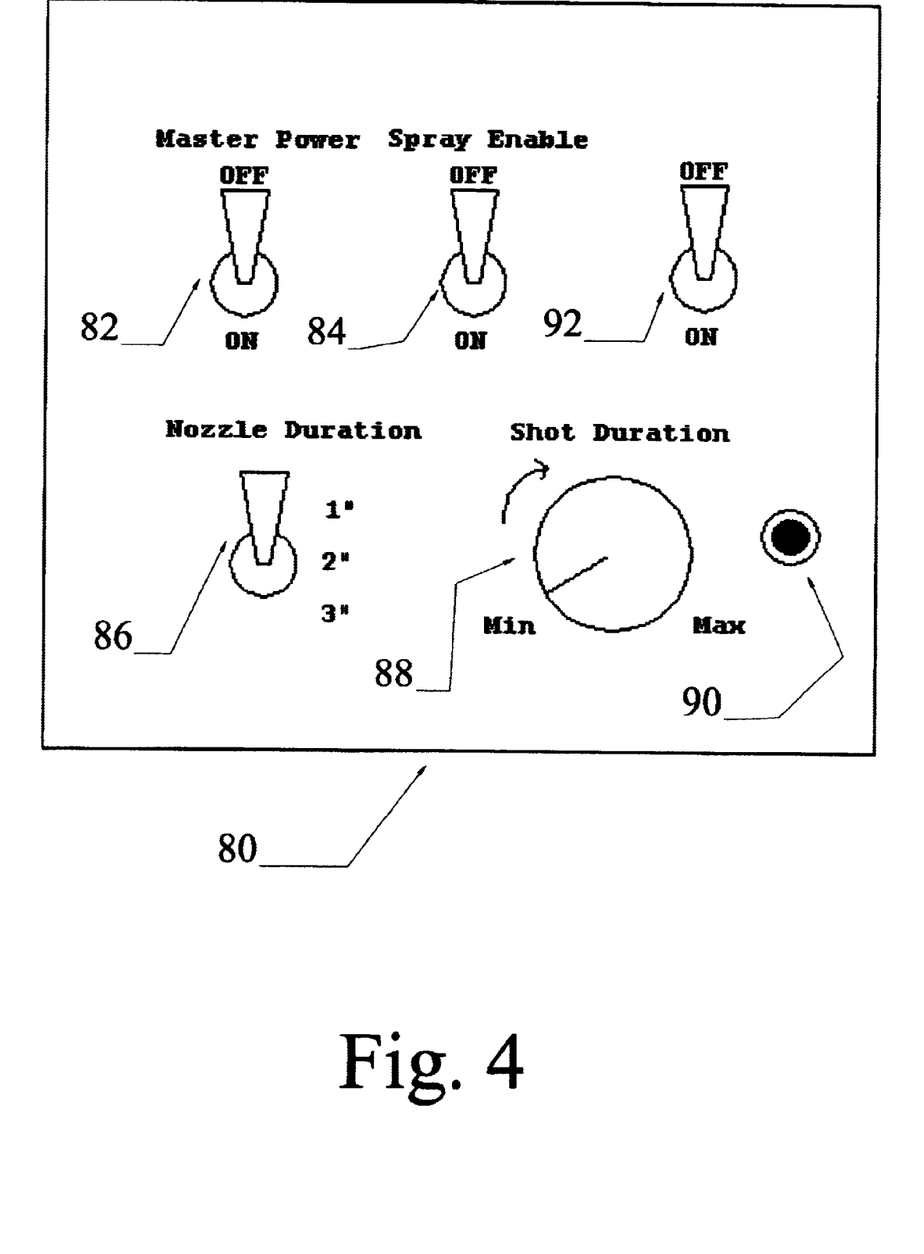
FIG. 4 illustrates a control panel used to operate the aerial spray marking apparatus.

Referring to FIG. 4, it can be seen that the control panel 80 comprises a master power switch 82, a spray enable switch 84, a shot interval switch 86 and a shot duration control knob 88. The control panel 80 also has an indicator 90, such as a light, that is activated to provided an indication of when the controller 76 has shut down the apparatus 10 by closing the second shut off valve 58.

The master power switch 82 is an on-off switch that provides power (typically from the aircraft's power supply) to the control panel 80. The spray enable switch 84 is also an on-off switch. However, this switch 84 activates the controller 76 and allows it to send the control signals to the solenoid valve 62. The shot interval switch 86 is a toggle switch that controls the time interval between spray shots from the spray nozzle 66. That is, the total time from the start of one shot to the start of the next shot. By way of example, FIG. 4 shows that the shot interval switch 86 provides three possible shot intervals: one second, two seconds and three seconds. It should be noted that the present invention is not limited to these intervals and that other intervals could be utilized. The shot duration control knob 88 controls the duration of each spray shot, wherein the shot duration (i.e., the time from beginning to end of the shot) is some percentage of the shot interval. The shot duration control knob 88 varies from a minimum to a maximum setting. Typically, the minimum setting will correspond to about 20–40% of the shot interval and the maximum setting will correspond to about 60–80% of the shot interval. The settings of the control panel 80 will dictate how the controller 76 controls the switching of the solenoid valve 62. Accordingly, by manipulating the knobs and switches of the control panel 80, a user is able to select the interval and duration of spray shots discharged from the nozzle 66. For example, if the shot interval switch 86 is set at one second and the shot duration control knob 88 is set at 50%, then the spray nozzle 66 will emit shots of marking substance having a duration of 0.5 seconds and a 0.5 second interval between the end of one shot and the start of the next shot.

The control panel 80 also includes a continuous spray switch 92. The continuous spray switch 92 is an on-off switch that, when turned on, causes the controller 76 to ignore the settings of the shot interval switch 86 and the shot duration control knob 88 and open the main valve 60 so that the spray nozzle 66 will emit a continuous stream of marking substance.

The controller 76 can be used with a Global Positioning System (GPS) to provide precision aerial marking capability. For instance, the controller 76 could be set up to send a signal to the GPS at the same time that it causes the main valve 60 to open for spraying a shot. The resultant GPS information and the height of the nozzle 68 above the ground (which is derived from the aircraft's altitude) can then be used to calculate the exact position of the marking on the ground surface.

Figure 5:
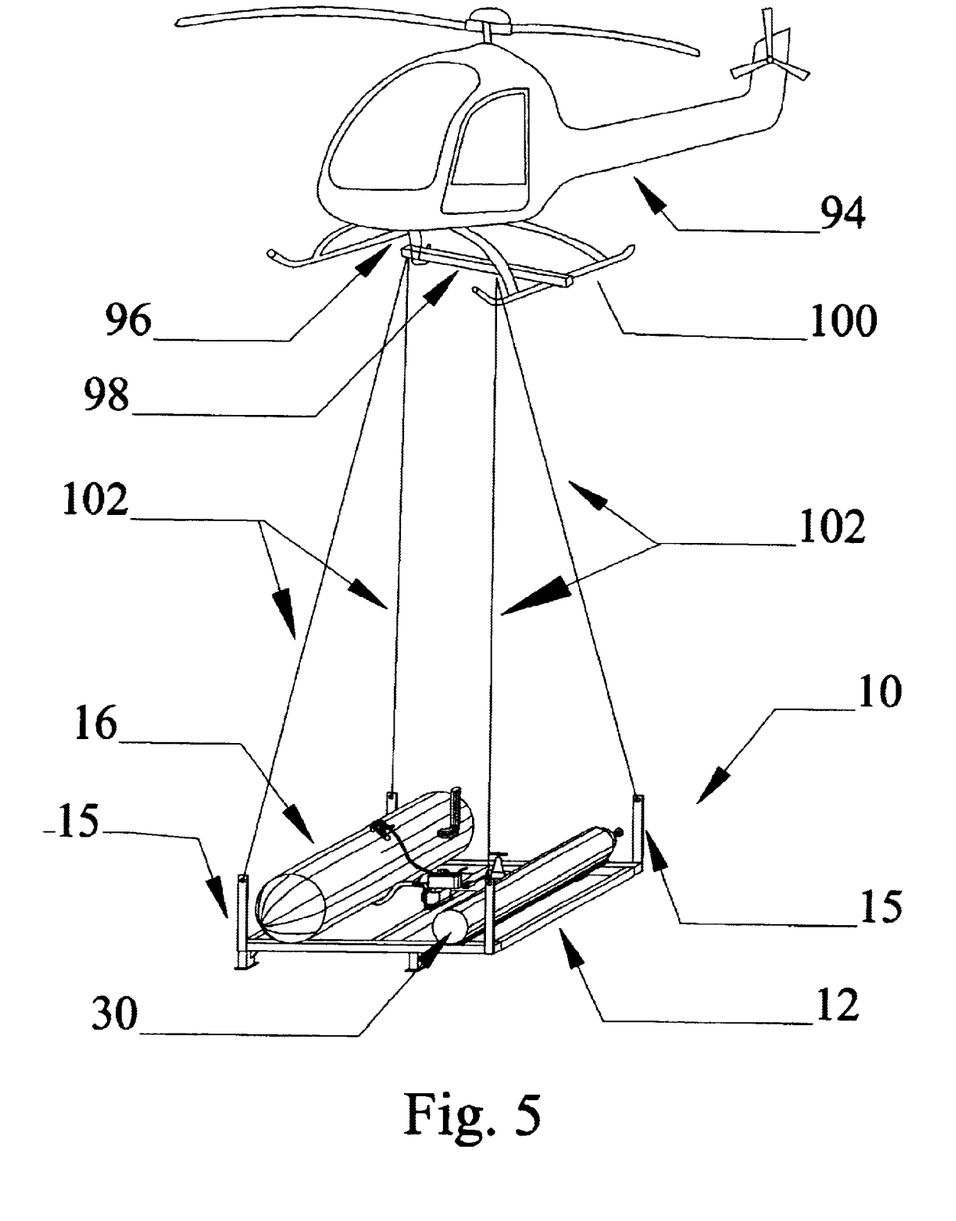
FIG. 5 illustrates the aerial spray marking apparatus in operation, suspended from a helicopter.

Turning to FIG. 5, one possible mounting arrangement is shown. In this case, the aerial spray marking apparatus 10 is shown suspended from a helicopter 94. While a helicopter is a preferred means for employing the apparatus 10, it is noted that the apparatus 10 can be used with other types of aircraft as well.

The mounting arrangement shown in FIG. 5 utilizes a cargo hook 96 on the underside of the helicopter 94 and a stabilizing bar 98. The cargo hook 96 is standard equipment in most helicopters. In general, the use of stabilizing bars with helicopters is known. In this case, the stabilizing bar 98 is located below the helicopter 94, supported at one end by one of the helicopter's skids 100 and supported at the other end by the cargo hook 96. The apparatus 10 is attached to the helicopter 94 by cables 102 connected to the attachment arms 15. The cables 102 connected to the two attachment arms 15 on the cylinder end of the frame 12 are attached to the end of the stabilizing bar 98 that is supported by the helicopter skid 100. The cables 102 connected to the two attachment arms 15 on the tank end of the frame 12 are attached to the end of the stabilizing bar 98 that is supported by the cargo hook 96. Thus, the cargo hook supports the load of the heavier tank end of the apparatus 10. Also, the apparatus 10 is thus oriented with respect to the direction of flight such that when the hinge 64 is pivoted, the spray nozzle will be angled backward from the flight direction. Although not shown in the Figures, the apparatus 10 can have a skid plate attached to the underside of the frame 12. The skid plate is a strong metal plate that functions to protect the apparatus from treetops and the like that may be inadvertently stuck in flight.

The marking substance can be any suitable substance, such as paints, dyes, foams and the like, that can be used for marking ground surfaces. One preferred marking substance is a specially-processed paint that is thinned so as to have a proper viscosity for the apparatus 10. This substance comprises a commercially available tree marking paint mixed with mineral spirits and then further thinned with water. In one preferred embodiment, the substance comprises two parts paint and one part mineral spirits mixed thoroughly. Then, just prior to filling the storage tank 16, one part water is added to the paint-mineral spirits mixture. Adding the water at the last possible moment extends the time before paint/water separation will occur. An alternative marking substance includes a luminescent material, such as a phosphorescent pigment, so as to be visible in the dark. One possible mixture comprises about 50 percent by weight clear (i.e., no pigment) paint thoroughly mixed with about 40 percent by weight phosphorescent pigment and about 10 percent by weight mineral spirits. Such a marking substance would be of use to mark ranges for nighttime military exercises.

In use, the apparatus 10 is first readied prior to a marking operation by filling the storage tank 16 with the desired marking substance. This is accomplished by pouring the marking substance into the fill tube 24 with the vent 22 open to permit air to be vented from the tank 16. Total oxygen venting of the tank 16 during filling ensures, that the apparatus 10 is completely inert prior to operation. The compressed gas cylinder 30 is strapped onto the frame 12, and the high pressure line 44 is coupled to the cylinder outlet valve 42. The cylinder 30 should have sufficient volume to pressurize and remove the contents of the storage tank 16 and run the solenoid valve 62. The operating pressure of the pressure regulator 38 is adjusted to provide the spray shot forcefulness desired for the marking operation. The forcefulness is selected based on the nature of the ground surface being marked. For instance, forested areas will require more forceful spray shots than non-forested terrain because the marking substance must be able to penetrate the forest canopy. Lastly, the apparatus 10 is mounted to an aircraft via the attachment arms 15.

Once the apparatus 10 is ready, the aircraft flies over the target site. Spray marking is commenced by activating the apparatus 10 via the control panel 80 while the aircraft flies over the appropriate locations. The shot interval switch 86, shot duration control knob 88 and continuous spray switch 92 on the control panel are set to the appropriate settings to achieve the desired spray shots from the nozzle 66. The shot frequency and duration will control the size and spacing of the resultant markings and are thus selected based on the purpose for which the markings are to be used.

Although not so limited, the aerial spray marking apparatus 10 is particularly useful in marking large blocks of forested land for harvesting, commercial thinning or pre-commercial thinning purposes. This is because the apparatus 10 can produce an extremely forceful spray shot that is capable of penetrating dense foliage. Furthermore, the solid stream spray nozzle 66 produces a tight, precisely directed spray shot. The apparatus 10 can be flown over the treetops and mark the ground surface in significantly less time than it would take a large crew of workers on the ground to mark the same block.

In marking forested areas, the operator should first consider various factors of the block or blocks to be marked such as the stocking levels, soil classification, average stand height and species composition. These factors will go into selecting the operating pressure, nozzle size and aircraft airspeed for the operation. Tall, dense growths will require larger nozzles at high operating pressures and low airspeeds to provide penetration of the canopy. Generally, a ¼ inch nozzle size will be used for tall, dense growth. As height and density of the canopies decrease, airspeed can be increased and nozzle size and pressure can be decreased. Non-Forested areas can be marked at higher airspeeds and with smaller nozzles and lower pressures. This will reduce the amount of marking substance used during the marking operation.

Aircraft height will vary according to site conditions. Generally, the maximum spray height above ground level will be about 65 feet. Lower spray heights allow faster airspeeds and lower operating pressures. Weather conditions should also be considered. Low temperatures, high humidity and low temperature/dew point spread will cause longer drying times for the marking substance. Lower temperatures will also decrease maximum spray height due to viscosity changes in the marking substance. The airspeed of the aircraft will also be impacted by wind conditions because of the affect of wind shear on the stream of marking substance. Generally, as the wind increases, the airspeed should be decreased proportionately.

The foregoing has described a method and apparatus for easily and quickly marking ground surfaces, including heavily forested areas, from the air. It should be noted that the methods and apparatus discussed herein are not limited to ground marking operations and could be used for other purposes such as spraying pesticides, fertilizers, water and fire-fighting chemicals.

While specific embodiments of the present invention have been described, it will be apparent to those skilled in the art that various modifications thereto can be made without departing from the spirit and scope of the invention as defined in the appended claims.

What is claimed is:

1. A system for aerial spray marking of ground surfaces, said system comprising:

a storage tank for holding a marking substance;

a cylinder of compressed gas for pressurizing said storage tank;

a pressure regulator;

a high pressure line connecting said cylinder to said pressure regulator;

a first regulated gas line connecting said pressure regulator to said storage tank;

a spray nozzle assembly, said spray nozzle assembly including a first valve, a spray nozzle connected to said first valve, and a second valve arranged to open and close said fist valve;

a feed line connecting said storage tank and said first valve so as to deliver pressurized substance to said spray nozzle assembly;

a second regulated gas line connecting said pressure regulator to said second valve; and first and second pneumatic control ports fluidly connecting said second valve to said first valve, wherein said second valve is a solenoid valve having a first state in which said first pneumatic control port is pressurized by said second regulated gas line and a second state in which said second pneumatic control port is pressurized by said second regulated gas line, and wherein said first valve is closed when said first pneumatic control port is pressurized and said first valve is opened when said second pneumatic control port is pressurized.

2. The system of claim 1 wherein said cylinder contains an inert gas.

3. The system of claim 1 wherein said spray nozzle is a solid stream spray nozzle.

4. The system of claim 1 further comprising means for tilting said spray nozzle.

5. The system of claim 1 further comprising a controller for controlling said second valve.

6. The system of claim 5 further comprising means for selecting how said controller controls said second valve.

7. The system of claim 5 further comprising a shut off valve disposed in said feed line.

8. The system of claim 7 further comprising means for sensing pressure of gas output from said pressure regulator, said controller controlling said shut off valve in response to said means for sensing pressure.

9. The system of claim 1 further comprising a frame, said storage tank, said cylinder and said spray nozzle assembly all being mounted on said frame.

10. The system of claim 9 wherein said cylinder is removably mounted to said frame.

11. The system of claim 9 further comprising means for supporting said frame from an aircraft.

12. The system of claim 11 wherein said means for supporting includes at least one attachment arm extending from said frame and a cable connected at one end to said attachment arm and at another end to an aircraft.

13. The system of claim 1 wherein said spray nozzle assembly includes a main valve connected to said feed line and a spray nozzle connected to said main valve.

14. The system of claim 13 wherein said spray nozzle is a solid stream spray nozzle.

15. The system of claim 13 further comprising means for tilting said spray nozzle.

16. The system of claim 13 further comprising a shut off valve disposed in said feed line between said storage tank and said main valve.

* * * * *